(12) United States Patent
Ripley et al.

(10) Patent No.: US 11,729,645 B2
(45) Date of Patent: Aug. 15, 2023

(54) DEVICES AND METHODS FOR MONITORING A SERIAL BUS

(71) Applicant: SKYWORKS SOLUTIONS, INC., Irvine, CA (US)

(72) Inventors: David Steven Ripley, Marion, IA (US); James Henry Ross, Cedar Rapids, IA (US); Philip John Lehtola, Cedar Rapids, IA (US); David Richard Pehlke, Westlake Village, CA (US); James Phillip Young, Cedar Rapids, IA (US); Gregory A. Blum, Cedar Rapids, IA (US); David Alan Brown, San Jose, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 193 days.

(21) Appl. No.: 17/135,578

(22) Filed: Dec. 28, 2020

(65) Prior Publication Data

US 2021/0211909 A1 Jul. 8, 2021

Related U.S. Application Data

(63) Continuation of application No. 15/043,436, filed on Feb. 12, 2016, now Pat. No. 10,880,764.

(Continued)

(51) Int. Cl.
*H04M 3/00* (2006.01)
*H04W 24/08* (2009.01)
(Continued)

(52) U.S. Cl.
CPC ....... *H04W 24/08* (2013.01); *H04L 12/40032* (2013.01); *H04W 4/50* (2018.02)

(58) Field of Classification Search
CPC .. H04W 24/08; H04W 4/50; H04L 12/40032; H04L 43/0817; G06F 11/3089; G06F 13/4282
See application file for complete search history.

(56) References Cited

U.S. PATENT DOCUMENTS

2009/0313454 A1 12/2009 Sasaki
2010/0325325 A1 12/2010 Fernald et al.
(Continued)

FOREIGN PATENT DOCUMENTS

CN 1722123 1/2006
CN 1908925 2/2007
(Continued)

OTHER PUBLICATIONS

International Search Report and Written Opinion for PCT/US2016/017890 dated Sep. 12, 2016.
(Continued)

*Primary Examiner* — Xin Jia
(74) *Attorney, Agent, or Firm* — Chang & Hale LLP

(57) ABSTRACT

According to some implementations, a radio-frequency (RF) device includes a communication interface coupled to a serial bus. The RF device also includes a monitoring component coupled to the communication interface, the monitoring component configured to monitor the serial bus for first data transmitted to a first device coupled to the serial bus and configure the RF device based on the first data.

9 Claims, 6 Drawing Sheets

Related U.S. Application Data

(60) Provisional application No. 62/116,544, filed on Feb. 15, 2015.

(51) Int. Cl.
*H04W 4/50* (2018.01)
*H04L 12/40* (2006.01)

(56) References Cited

U.S. PATENT DOCUMENTS

| | | |
|---|---|---|
| 2012/0071118 A1 | 3/2012 | Ripley et al. |
| 2012/0076146 A1 | 3/2012 | Rohatschek et al. |
| 2012/0166677 A1 | 6/2012 | Obkircher |
| 2012/0185623 A1* | 7/2012 | Ross ................ G06F 13/362 710/63 |
| 2013/0262710 A1 | 10/2013 | Luo |
| 2013/0297829 A1 | 11/2013 | Berenbaum et al. |
| 2014/0281079 A1 | 9/2014 | Biskup |
| 2015/0095537 A1 | 4/2015 | Sengoku |

FOREIGN PATENT DOCUMENTS

| | | |
|---|---|---|
| CN | 102142987 | 8/2011 |
| EP | 2728763 | 5/2014 |
| KR | 10-2006-0084003 | 7/2006 |

OTHER PUBLICATIONS 201680020301.8, CN, Circuits, Devices, and Methods for Monitoring a Serial Bus, Sep. 30, 2017.
18108352.5, HK, Circuits, Devices, and Methods for Monitoring a Serial Bus, Jun. 28, 2018.
10-2017-7025955, KR, Circuits, Devices, and Methods for Monitoring a Serial Bus, Sep. 14, 2017.
PCT/US2016/017890, WO, Circuits, Devices, and Methods for Monitoring a Serial Bus, Feb. 12, 2016.

* cited by examiner

DEVICES AND METHODS FOR MONITORING A SERIAL BUS

CROSS-REFERENCE TO RELATED APPLICATION(S)

This application is a continuation of U.S. patent application Ser. No. 15/043,436, filed Feb. 12, 2016, entitled "CIRCUITS, DEVICES, AND METHODS FOR MONITORING A SERIAL BUS," which claims priority to U.S. Provisional Application No. 62/116,544, filed Feb. 15, 2015, entitled "CIRCUITS, DEVICES, AND METHODS FOR MONITORING A RADIO-FREQUENCY FRONT-END (RFFE) SERIAL BUS." The contents of each of the above-referenced application(s) are hereby expressly incorporated by reference herein in their entireties for all purposes.

BACKGROUND

Field

The present disclosure relates to serial buses and/or serial interfaces.

Description of the Related Art

Many wireless communication devices (e.g., a cellular handset system) use a serial bus. The use of serial buses in these wireless communication devices may allow for increased complexity of the radio-frequency (RF) components and the configuration of the RF components used in the wireless communication devices. For example, multiple configuration modes, detailed feedback, and timing synchronization may be accomplished using a serial bus shared amongst multiple RF devices/components. Examples of the devices/components on that may use a serial bus may include, but are not limited to, a power amplifier (PA), a RF power supply management component/module, a low-noise amplifier (LNA), a diplexer, a filter, a load circuit, a matching circuit, an antenna switch, a voltage regulator, a power source (e.g., a voltage source), and an antenna tuner.

SUMMARY

In some implementations, the present disclosure relates to a radio-frequency (RF) device. The RF device includes a communication interface coupled to a serial bus. The RF device also includes a monitoring component coupled to the communication interface, the monitoring component configured to monitor the serial bus for first data transmitted to a first device coupled to the serial bus and configure the RF device based on the first data.

In some embodiments, the first data indicates a configuration of the first device.

In some embodiments, the first data indicates an operation of the first device.

In some embodiments, the first data indicates a mode of the first device.

In some embodiments, the monitoring component is further configured to monitor the serial bus for second data of a second device coupled to the serial bus and to configure the RF device based on the second data.

In some embodiments, the RF device further includes a second monitoring component configured to monitor the serial bus for second data of a second device coupled to the serial bus and to configure the RF device based on the second data.

In some embodiments, the RF device and the first device are located in a same RF module.

In some embodiments, the RF device and the first device are located in separate RF modules.

In some embodiments, the monitoring component is configured to configure the RF device by adjusting a configuration of the RF device.

In some embodiments, the monitoring component is configured to configure the RF device by performing an operation.

In some embodiments, the monitoring component is configured to configure the RF device by changing a mode of the RF device.

In some embodiments, the serial bus includes a radio-frequency front end (RFFE) bus.

In some implementations, the present disclosure relates to a radio-frequency (RF) module. The RF modules includes a serial bus. The RF module also includes a first device coupled to the serial bus, the first device including a monitoring component configured to monitor the serial bus for first data transmitted to a second device coupled to the serial bus and configure the first device based on the first data.

In some embodiments, the first data indicates a configuration of the second device.

In some embodiments, the first data indicates an operation of the second device.

In some embodiments, the first data indicates a mode of the second device.

In some embodiments, the monitoring component is further configured to monitor the serial bus for second data of a third device coupled to the serial bus and to configure the first device based on the second data.

In some embodiments, the RF module further includes a second monitoring component configured to monitor the serial bus for second data of a third device coupled to the serial bus and to configure the first device based on the second data.

In some embodiments, the RF module further includes the second device.

In some embodiments, the second device is located in a separate RF module.

In some embodiments, the monitoring component is configured to configure the first device by adjusting a configuration of the first device.

In some embodiments, the monitoring component is configured to configure the first device by performing an operation.

In some embodiments, the monitoring component is configured to configure the first device by changing a mode of the first device.

In some embodiments, the serial bus includes a radio-frequency front end (RFFE) bus.

In some implementations, the present disclosure relates to a wireless device. The wireless device includes a serial bus. The wireless device also includes a RF module coupled to the serial bus, the RF module including a first device, the first device including a monitoring component configured to monitor the serial bus for first data transmitted to a second device coupled to the serial bus and configure the first device based on the first data.

In some embodiments, the first data indicates a configuration of the second device.

In some embodiments, the first data indicates an operation of the second device.

In some embodiments, the first data indicates a mode of the second device.

In some embodiments, the monitoring component is further configured to monitor the serial bus for second data of a third device coupled to the serial bus and to configure the first device based on the second data.

In some embodiments, the wireless device further includes a second monitoring component configured to monitor the serial bus for second data of a third device coupled to the serial bus and to configure the first device based on the second data.

In some embodiments, the RF module further includes the second device.

In some embodiments, the second device is located in a separate RF module.

In some embodiments, the monitoring component is configured to configure the first device by adjusting a configuration of the first device.

In some embodiments, the monitoring component is configured to configure the first device by performing an operation.

In some embodiments, the monitoring component is configured to configure the first device by changing a mode of the first device.

In some embodiments, the serial bus includes a radio-frequency front end (RFFE) bus.

In some implementations, the present disclosure relates to method of operating a RF device. The method includes monitoring a serial bus for first data transmitted to a first device coupled to the serial bus. The method also includes configuring a second device based on the first data.

In some embodiments, the first data indicates a configuration of the first device.

In some embodiments, the first data indicates an operation of the first device.

In some embodiments, the first data indicates a mode of the first device.

In some embodiments, the method further includes monitoring the serial bus for second data of a third device coupled to the serial bus and configuring the first device based on the second data.

In some embodiments, the first device and the second device are located in a same RF module.

In some embodiments, the first device and the second device are located in separate RF modules.

In some embodiments, configuring the first device includes adjusting a configuration of the first device.

In some embodiments, configuring the first device includes performing an operation.

In some embodiments, configuring the first device includes changing a mode of the RF device.

In some embodiments, the serial bus includes a radio-frequency front end (RFFE) bus.

DETAILED DESCRIPTION OF SOME EMBODIMENTS

The headings provided herein, if any, are for convenience only and do not necessarily affect the scope or meaning of the claimed invention.

Disclosed are non-limiting examples of systems, devices, circuits and/or methods related to techniques for monitoring a serial bus. Although the present disclosure may be described in the context of a serial bus/interface, one having ordinary skill in the art understands that one or more features of the present disclosure may also be utilized in other applications. For example, the examples, embodiments, implementations, and/or features described herein may be utilized with an RF front-end (RFFE) bus, an Inter-Integrated Circuit (I2C) bus, a serial peripheral interface (SPI), and/or other types of serial buses/interfaces.

Many wireless communication devices (e.g., a cellular handset system) use a serial bus. The use of serial buses in these wireless communication devices may allow for increased complexity of the radio-frequency (RF) components and the configuration of the RF components used in the wireless communication devices. For example, multiple configuration modes, detailed feedback, and timing synchronization may be accomplished using interface signals (e.g., 3 interface signals) shared amongst multiple RF devices, RF components, RF modules, and/or RF circuits. Examples of the devices, components, circuits, and/or modules on the serial bus may include, but are not limited to, the power amplifier (PA), RF power supply management, antenna switch, and antenna tuner. While messages for all devices/components are present on the serial bus and visible to each of the connected devices/components, signaling protocols within the message identify which device/component should receive and respond to the message. As a result a device/component, such as a PA, often has little or no knowledge of the configuration and/or state of the other devices/components on the bus.

Described herein are examples of monitoring a serial bus. In one embodiment, a bus monitoring function/logic (e.g., software, hardware, firmware, or a combination thereof) may be part of a slave device/component (e.g., included or implemented within the slave device/component) that is coupled to the serial bus. All messages may be visible to all slave components/devices on the serial bus. The bus monitoring function/logic (e.g., a monitor) may allow a slave device/component to process and/or interpret messages intended for other slave devices/components on the serial bus. The bus monitoring function/logic may utilize the information to improve the performance of the device/component (e.g., optimize, increase efficiency) beyond the configuration information sent to the device/component.

Figure 1A:
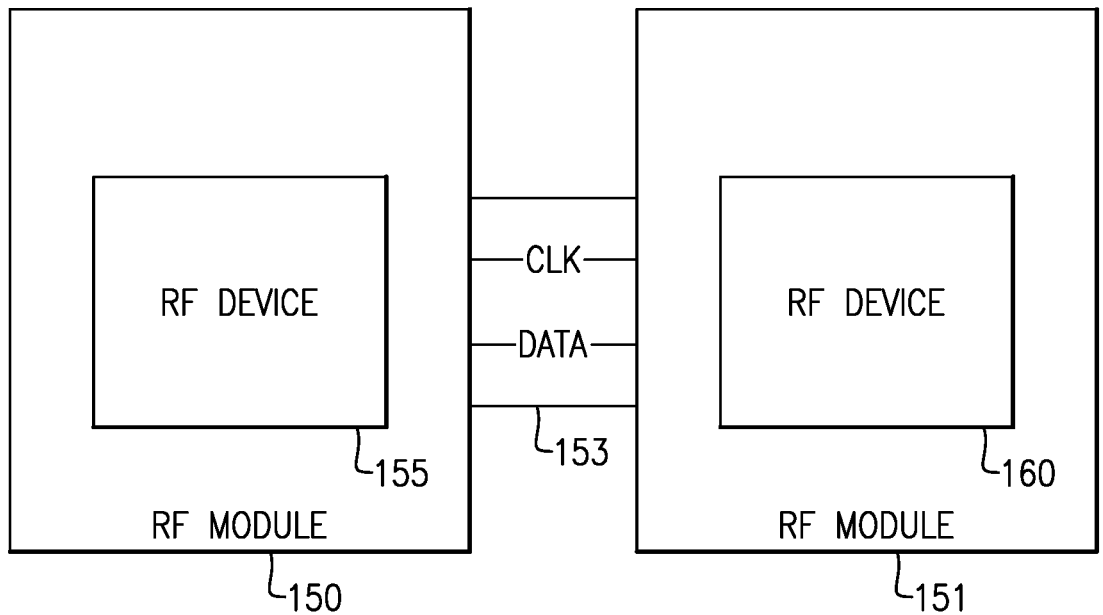
FIG. 1A is a block diagram illustrating example RF modules, according to some embodiments of the present disclosure.

FIG. 1A is a block diagram illustrating a RF module 150 and a RF module 151, according to some embodiments of the present disclosure. RF module 150 includes an RF device 155 and RF module 151 includes RF device 160. As illustrated in FIG. 1A, the RF device 155 and the RF device 160 are located in separate RF modules. In one embodiment, the RF module 150 may be coupled to the RF module 151 via a serial bus 153 (e.g., an RFFE bus/interface). The serial bus 153 may include multiple lines (e.g., multiple pins, multiple traces, etc.) that may communicate (e.g., transmit and/or receive) signals and/or data between the RF module 150 and the RF module 151. The RF device 155 and RF device 160 may use the serial bus 153 to communicate signals and/or serial data. As illustrated in FIG. 1A, the serial bus 153 includes a DATA line that may transmit serial data (e.g., messages, commands, frames, packets, bits, etc.) between the RF module 150 and the RF module 151. For example, the DATA line may communicate data one bit at a time (e.g., may communicate data serially or sequentially). The serial bus 153 further includes a CLK line that may transmit a clock signal between the RF module 150 and the RF module 151. The RF device 155 and the RF device 160 may use the clock signal and/or the CLK line to control the timing of the serial bus 153. For example, the serial bus 153 may operate at the frequency of the clock signal (e.g., the DATA line may be synchronized with the clock signal). One having ordinary skill in the art understand that in other embodiments, the serial bus 153 may include additional lines (e.g., additional pins, additional traces, etc.). One having ordinary skill in the art also understands that the RF modules 150 and 151 may include various other devices (e.g., RF devices), circuits (e.g., RF circuits), components (e.g., RF components), and/or modules (e.g., RF modules).

Figure 1B:
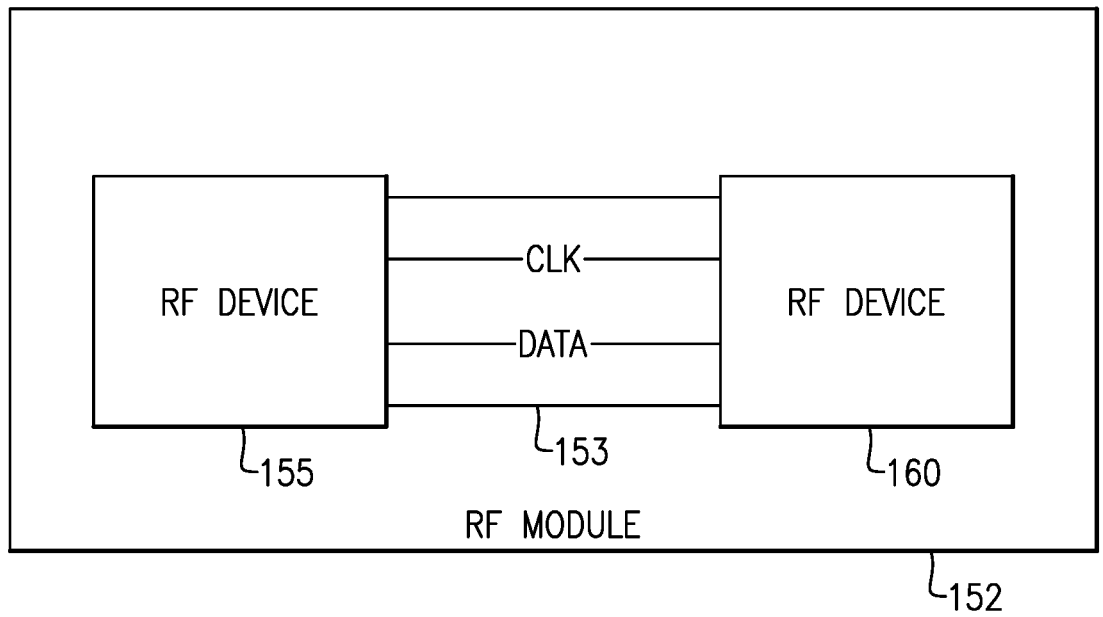
FIG. 1B is a block diagram illustrating an example RF module, according to some embodiments of the present disclosure.

FIG. 1B is a block diagram illustrating an example RF module 152, according to some embodiments of the present disclosure. RF module 152 includes the RF device 155 and the RF device 160. The RF device 155 may be coupled to the RF device 160 via a serial bus 153 (e.g., an RFFE bus). The serial bus 153 may include multiple lines (e.g., multiple pins, multiple traces, etc.) that may communicate (e.g., transmit and/or receive) signals and/or data between the RF device 155 and the RF device 160, as discussed above. The RF device 155 and RF device 160 may use the serial bus 153 to communicate signals and/or serial data, as discussed above. As illustrated in FIG. 1B, the serial bus 153 includes a DATA line that may transmit serial data (e.g., messages, commands, frames, packets, bits, etc.) between the RF device 155 and the RF device 160. The serial bus 153 further includes a CLK line that may transmit a clock signal between the RF device 155 and the RF device 160. The RF device 155 and the RF device 160 may use the clock signal and/or the control the timing of the transmission of data, as discussed above. One having ordinary skill in the art understand that in other embodiments, the serial bus 153 may include additional lines (e.g., additional pins, additional traces, etc.). One having ordinary skill in the art also understands that the RF modules 150 and 151 may include various other devices (e.g., RF devices), circuits (e.g., RF circuits), components (e.g., RF components), and/or modules (e.g., RF modules).

Figure 2:
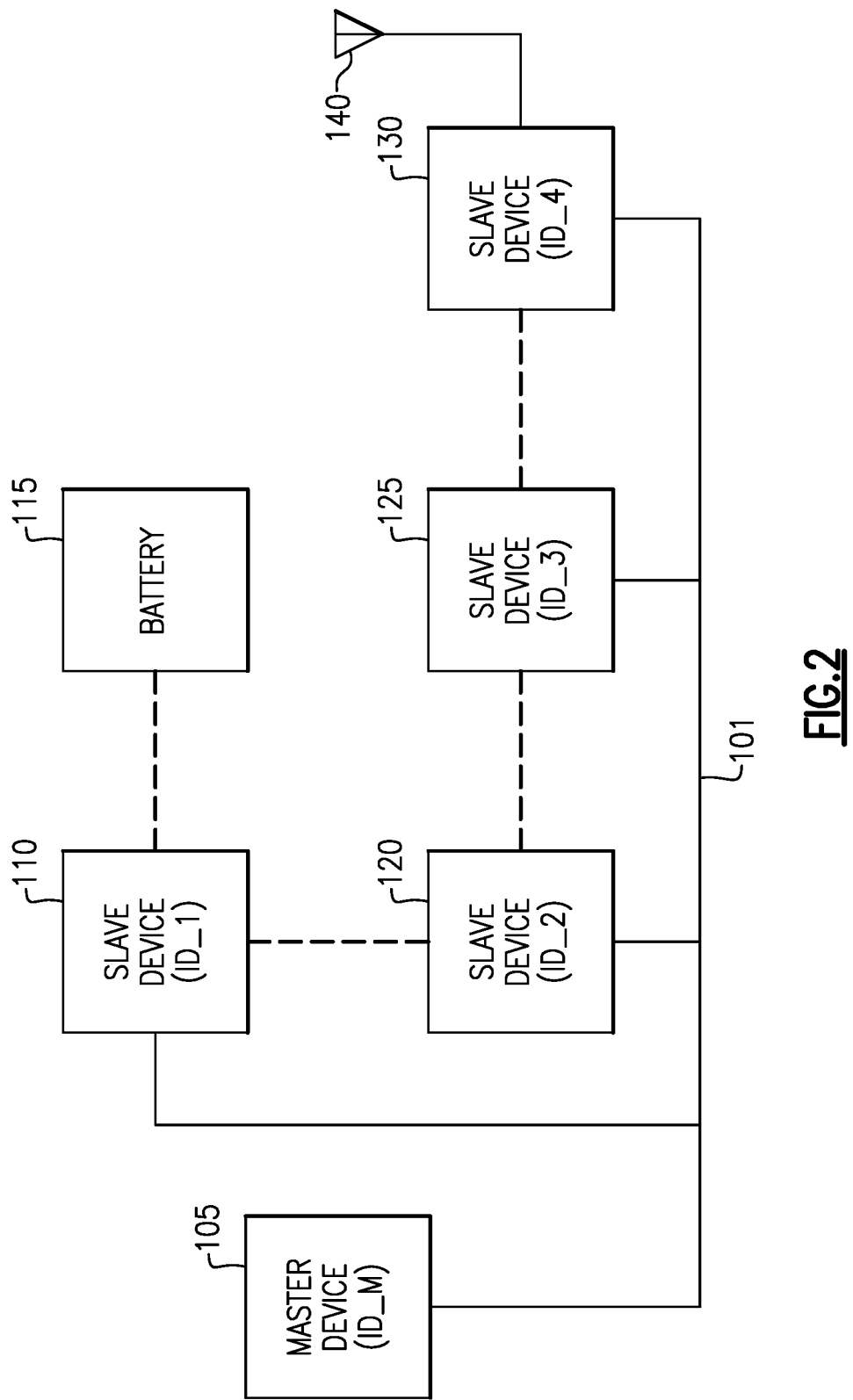
FIG. 2 is a block diagram of device/components coupled together via a serial bus/interface, according to some embodiments of the present disclosure.

FIG. 2 is a block diagram of device/components (e.g., RF devices/components) coupled together via a serial bus/interface (e.g., an RFFE bus/interface), according to some embodiments of the present disclosure. The master device 105, the slave devices 110, 120, 125, and 130, and the serial bus 101 may be part of an RF front end and/or may be included in a module. In another embodiment one or more of the master device 105, the slave devices 110, 120, 125, and 130 may be located in a separate module. The serial bus 101 may include one or more lines (e.g., pins, data lines, signal lines, clock lines, etc.), as discuss in more detail below. The master device 105 device/component may control the configuration and/or operation of the slave devices 110, 120, 125, and 130 coupled to the serial bus 101. For example, the master device 105 device/component may control the configuration and/or operation of one or more of the slave device 110, slave device 120, slave device 125, and slave device 130. As illustrated in FIG. 1, the master device 105, slave device 110, slave device 120, slave device 125 and slave device 130 are coupled to each other via the serial bus 101. In one embodiment, one or more of the slave devices may also be coupled to each other separate from the serial bus 101. For example, slave device 110 is coupled to slave device 120. In another example, slave device 120 is coupled to slave device 125. In a further example, slave device 125 is coupled to slave device 130. The slave device 110 is coupled to a battery 115. The slave device 130 is coupled to an antenna 140 (e.g., a multi-band antenna, a single band antenna, etc.). The master device 105 may be referred to as a master module, a master component, a master, etc. The slave devices 110, 120, 125, and 130 may be referred to as slaves, slave modules, slave components, slaves, etc.

The master device 105 may transmit (e.g., send) individual messages to configure each slave device/component in the RF front end. For example, the master device 105 may transmit one or more messages (e.g., configuration messages or messages with data indicating a mode of a slave device/component and/or how a slave device/component should operate or be configured) to the slave device 120. The slave devices/components may have little or no knowledge of the configuration of the other slave device/components on the bus. For example, slave device 120 may have little or no knowledge of the configuration of slave device 125.

In addition, individual messages with similar data (e.g., similar data indicating how a slave device/component should operate and/or be configured) may be sent to each slave device/component. This may reduce the available bandwidth of the serial bus 101. For example, slave device 120 and slave device 130 may be configured using a similar message. However, the master device 105 may transmit (e.g., send) two separate messages, one for slave device 120 and one for slave device 130.

As illustrated in FIG. 2, each of the master device 105 and the slave devices 110, 120, 125, and 130 may be associated with an identifier (e.g., each device may have an identifier). For example, the master device 105 has the identifier ID_M, the slave device 110 has the identifier ID_1, the slave device 120 has the identifier ID_2, the slave device 125 has the identifier ID_3, and the slave device 130 has the identifier ID_4. Each of the master device 105 and the slave devices 110, 120, 125, and 130 may be aware of its corresponding identifier. For example, the master device 105 may be aware that its identifier is ID_M, the slave device 110 may be aware that its identifier is ID_1, the slave device 120 may be aware that its identifier is ID_2, etc. The identifiers may be assigned by the master device 105 and/or by another device, module, circuit, component, etc. (e.g., by a device not illustrated in FIG. 2). The identifiers for a device may also be changed. For example, the master device 105 may change the identifier for slave device 110 from ID_1 to SLAVE_1.

In one embodiment, the identifiers may allow the master device 105 and the slave devices 110, 120, 125, and 130 to communicate data with each other. For example, the master device 105 may transmit a message to the slave device 120 and may include the identifier ID_2 in the message to indicate that the message is for the slave device 120. In another embodiment, the master device 105 and the slave devices 110, 120, 125, and 130 may each be aware of the identifiers for the other devices coupled to the serial bus 101.

For example, the slave device 110 may be aware of the identifiers for one or more of the master device 105, the slave device 120, the slave device 125, and the slave device 130. In another example, the master device 105 may be aware of the identifiers for the slave device 110, the slave device 120, the slave device 125 and the slave device 130.

As discussed above, configuration information for one other slave devices/components within a system (e.g., within the RF front end) may not be made available to other slave devices/components. In addition, providing this configuration information may use connections to multiple discrete analog and/or digital control lines. As a result, performance optimization may be limited to the individual device/component configuration or added board (e.g., signal) routing complexity. This may increase the package I/O and/or increase the risk of degraded isolation performance. Alternatively, a device/component may have been configured to require that information (e.g., configuration information) regarding other device states need to be written to the device/component. This would use multiple transmissions of similar messages which would decrease bandwidth of the common serial bus 101.

Figure 3:
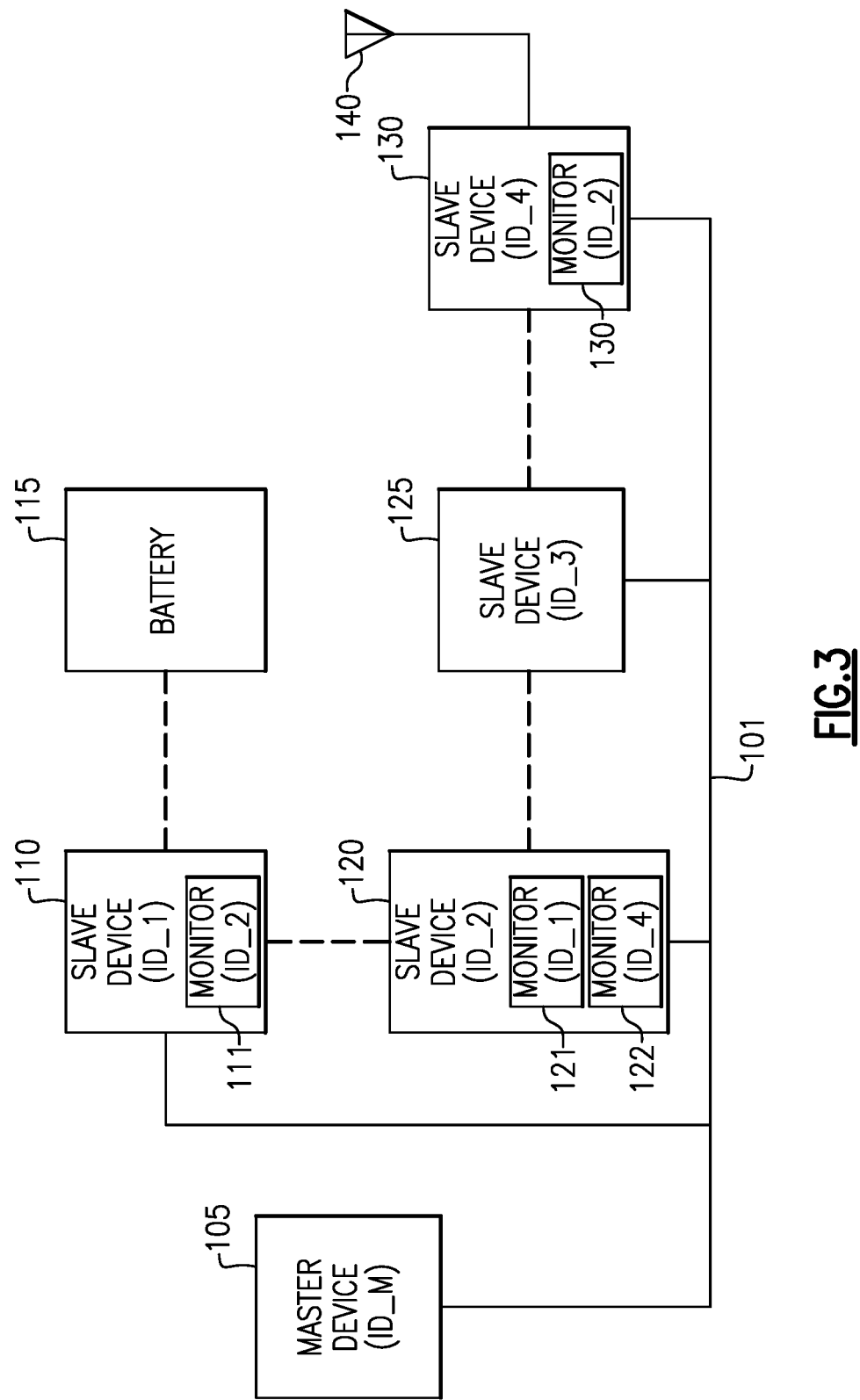
FIG. 3 is a block diagram of device/components coupled together via a serial bus/interface, according to some embodiments of the present disclosure.

FIG. 3 is a block diagram of device/components (e.g., RF devices/components) coupled together via a serial bus/interface (e.g., an RFFE bus/interface), according to some embodiments of the present disclosure. The master device 105, the slave devices 110, 120, 125, and 130, and the serial bus 101 may be part of an RF front end and/or may be included in a module. In another embodiment one or more of the master device 105, the slave devices 110, 120, 125, and 130 may be located in a separate module. The serial bus 101 may include one or more lines (e.g., pins, data lines, signal lines, clock lines, etc.), as discuss in more detail below. The master device 105 device/component may control the configuration and/or operation of the slave devices 110, 120, 125, and 130 coupled to the serial bus 101. As illustrated in FIG. 3, the master device 105, slave device 110, slave device 120, slave device 125 and slave device 130 are coupled to each other via the serial bus 101. In one embodiment, one or more of the slave devices may also be coupled to each other separate from the serial bus 101 (as illustrated by the dashed lines between the devices). The slave device 110 is coupled to a battery 115. The slave device 130 is coupled to an antenna 140 (e.g., a multi-band antenna, a single band antenna, etc.). The master device 105 may be referred to as a master module, a master component, a master, etc. The slave devices 110, 120, 125, and 130 may be referred to as slaves, slave modules, slave components, slaves, etc.

As illustrated in FIG. 3, each of the master device 105 and the slave devices 110, 120, 125, and 130 may be associated with an identifier (e.g., ID_M, ID_1, ID_2, ID_3, and ID_4). Each of the master device 105 and the slave devices 110, 120, 125, and 130 may be aware of its corresponding identifier. The identifiers may be assigned and/or changed by the master device 105 and/or by another device, module, circuit, component, etc. (e.g., by a device not illustrated in FIG. 2). In one embodiment, the identifiers may allow the master device 105 and the slave devices 110, 120, 125, and 130 to communicate data with each other. In another embodiment, the master device 105 and the slave devices 110, 120, 125, and 130 may each be aware of the identifiers for the other devices coupled to the serial bus 101.

With increasing complexity in modern wireless communication devices, many of the devices/components in the RF front end are sold as a system chipset but (for various reasons) may remain in separate packages. Alternately, many of the devices/components are specified with a standard register configuration. Given that the mode configuration information may be well understood for each device/component on the serial bus 101, the messages (e.g., configuration messages) for the other slave devices/components on the serial bus 101 may be processed (e.g., analyzed, interpreted, etc.) and may be used to further optimize the configuration for a given device/component.

As discussed above, the master device 105 may transmit (e.g., send) individual messages to each slave device/component to configure each slave device/component, to change a mode of each slave device/component, and/or to change the operation of the slave device/component. Also as discussed above, all messages transmitted via the serial bus 101 may be visible to all slave devices/components on the serial bus 101. Slave device 110, slave device 120, and slave device 130, include monitors (e.g., bus monitoring logic/functions) that allow slave device 110, slave device 120, and slave device 130 to monitor, receives, and/or process messages intend for other slave devices. For example, slave device 110 includes a monitor 111 (e.g., a bus monitoring logic/function) to monitor the serial bus for messages and/or data transmitted to slave device 120 (messages that are sent to identifier ID_2). In another example, slave device 120 includes a monitor 121 to monitor the serial bus for messages and/or data transmitted to slave device 110 (messages that are sent to identifier ID_1) and a monitor 121 to monitor the serial bus for messages and/or data transmitted to slave device 130 (messages that are sent to identifier ID_4). The monitors of the devices/components may include software, hardware (e.g., circuits), firmware, or a combination thereof. The monitors 111, 121, 122, and 131 may be referred to as monitoring modules, monitoring circuits, monitoring devices, and/or monitoring components. In one embodiment, a device/component may have multiple monitors. For example, slave device 120 includes monitor 121 and monitor 122. Each monitor may allow the slave device/component to monitor the serial bus for messages for a different slave device/component. For example, monitor 121 may allow the slave device 120 to monitor the serial bus 101 for messages transmitted to slave device 110 (e.g., to monitor the configuration of slave device 110) and monitor 122 may allow the slave device 120 to monitor the bus for messages transmitted to slave device 130 (e.g., to monitor the configuration of slave device 130). In another embodiment, a single monitor may allow the slave device/component to monitor messages for multiple slave devices/components. For example, a single monitor may allow the slave device 120 to monitor the serial bus 101 for messages transmitted to slave device 110 and slave device 130.

The monitors 111, 121, 122, and 131 (e.g., monitoring logic/functions) may allow device/component to receive and/or store messages intended for other devices/components on the serial bus 101. The monitors 111, 121, 122, and 131 may also allow a device/component to process and/or interpret messages intended for other slave device/components on the serial bus 101. In one embodiment, the messages (e.g., data) intended for another slave device may include data indicating one or more of a configuration of a slave device (e.g., how much power a slave device should use), an operation of a slave device (e.g., an operation to be performed by the slave device), and a mode of the slave device (e.g., transmit mode, receive mode, low power mode, etc.).

In one embodiment, a monitor (e.g., monitors 111, 121, 122, and 131) may configure a corresponding slave device by modifying the configuration of the slave device (e.g., configuring the slave device) based on data and/or a message transmitted to another slave device. For example, slave device 130 may be an antenna switch and the slave device 120 may be a PA. Data (e.g., a message) may be transmitted to the PA (e.g., transmitted by the master device 105) indicating that the PA (e.g., slave device 120) should change to a low power mode and/or turn off (e.g., OFF mode). The monitor of the antenna switch (e.g., monitor 131) may modify the configuration (or cause the modification) of the antenna switch by coupling the antenna 140 to a different PA. In one embodiment, the monitor (of the antenna switch) may configure/reconfigure the antenna switch without using a separate message directed to the antenna switch. For example, the master device 105 may not transmit a separate message (e.g., data) to the antenna switch (to configure/reconfigure the antenna switch) because the monitor of the antenna switch may configure/reconfigure the antenna switch based on the message transmitted to the PA.

In another embodiment, a monitor (e.g., monitors 111, 121, 122, and 131) may configure a corresponding slave device by modifying the operation of the slave device and/or causing the slave device to perform an operation based on data and/or a message transmitted to another slave device. For example, slave device 110 may be a PA and slave device 120 may be a power supply (e.g., a direct current (DC) power supply, a voltage source, etc.). Both the PA (e.g., slave device 110) and the power supply (e.g., slave device 120) may be configured/reconfigured in order for the PA to operate. For example, data (e.g., a message) may be transmitted to the PA (e.g., transmitted by the master device 105) indicating a configuration of the PA (e.g., indicating that the PA should amplify a signal, such as an RF signal, by a certain amount). The monitor (e.g., monitor 121) of the power supply may receive and/or process the message transmitted to the PA (via serial bus 101). The monitor may cause the power supply to adjust an amount of power provided to the PA (e.g., to perform an operation) so that the PA may use the power to amplify the signal. In one embodiment, the monitor (of the power supply) may perform an operation and/or may cause the power to perform an operation without using a separate message directed to the power supply. For example, the master device 105 may not transmit a separate message (e.g., data) to the power supply (to perform the operation) because the monitor of the power supply may perform the operation based on the message transmitted to the PA.

In a further embodiment, a monitor (e.g., monitors 111, 121, 122, and 131) may configure a corresponding slave device by changing the mode of the slave device based on data and/or a message transmitted to another slave device. For example, slave device 130 may be an antenna switch and the slave device 120 may be a PA. Data (e.g., a message) may be transmitted to the antenna switch (e.g., transmitted by the master device 105) indicating that the antenna switch (e.g., slave device 130) should couple the antenna 140 to a different PA. The monitor of the PA (e.g., monitor 122) may change the mode of the PA (e.g., slave device 120). For example, the PA may change to a low power mode and/or OFF mode because the PA is no longer coupled to the antenna 140. In one embodiment, the monitor (of the antenna switch) may change the mode of the PA without using a separate message directed to the PA. For example, the master device 105 may not transmit a separate message (e.g., data) to the PA (to change the mode of the PA) because the monitor of the PA may configure/reconfigure the antenna switch based on the message transmitted to the antenna switch.

In one embodiment, a monitor of a first slave device may use a message transmitted to another slave device to change the mode of the first slave device, configure the first slave device, and/or perform an operation when the first device is similar to and/or the same as the second device. For example, the first slave device and the second slave device may both be PAs. The second slave device may receive a message to change the amplification of a signal received by the second slave device. The first slave device may also change the amplification of a signal received by the first slave device based on the message transmitted to the second slave device. This may allow the master device 105 to change the mode, configure, and/or perform operations on multiple slave devices with a single message (which may reduce the amount of data/congestion on the serial bus 101).

In one embodiment, the master device 105 and/or the slave devices 110, 120, 125, and 130 may modify and/or adjust their corresponding configurations without using dedicated configuration registers within each device/component. This may allow for less duplication of the configuration information in each device/component. The device/component (e.g., RF front-end device/component) manufacturers may provide performance optimization without adding system complexity such as broadcast messaging which may use device specification standardization.

In one embodiment, the device/component configuration may be available before the functionality is activated rather than by sensing voltages or other conditions that occur as a result of the configuration change, a change in mode, and/or an operation. For example, slave device 110 may be aware of a configuration change to slave device 120 before the configuration change takes effect (e.g., is activated) on slave device 120 because the slave device may monitor messages directed to the slave device 120. This may allow the slave device 110 to reconfigure, change modes, and/or perform an operation before a configuration change takes effect on the slave device 120.

In one embodiment, the bus monitoring logic/functions within the slave devices/components may allow for increased efficiency (e.g., increased power efficiency, decreased latency in communications, decreased latency in performing operations and/or reconfiguring, etc.) of the devices of RF front end (e.g., master device 105, slave device 110, etc.) without reducing the available bandwidth of the serial bus 101. For example, a first slave device may change to low power mode based on a message transmitted to a second slave device which may allow the first slave device to use less power. In another example, a first slave device may perform an operation and/or reconfigure based on message transmitted to a second device, rather than waiting for a second message instructing the first slave device to perform the operation and/or reconfigure.

Figure 4:
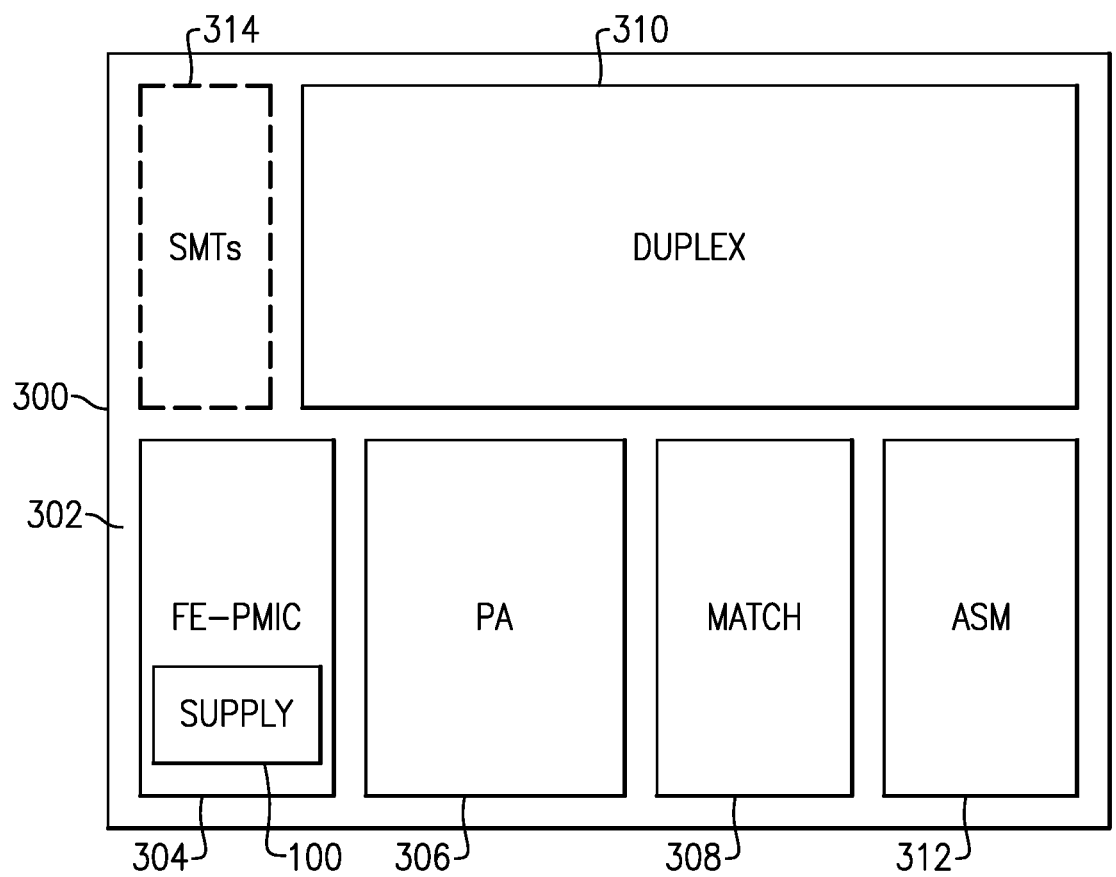
FIG. 4 is a diagram illustrating an example module, according to some embodiments of the present disclosure.

FIG. 4 shows that in some embodiments, some or all of the devices and/or serial buses/interfaces having one or more features as described herein may be implemented in a module. For example, the duplexer assembly 310 may include a monitor (e.g., monitor 111 illustrated in FIG. 3). In another example, the power amplifier assembly 306 may include a monitor. Such a module may be, for example, a front-end module (FEM). In the example of FIG. 8, a radio frequency (RF) module 300 can include a packaging substrate 302, and a number of components may be mounted on such a packaging substrate. For example, a front-end power management integrated circuit (FE-PMIC) component 304, a power amplifier assembly 306, a match component 308, and a duplexer assembly 310 may be mounted and/or implemented on and/or within the packaging substrate 302.

The FE-PMIC component 304 includes a supply 100 which may be a power supply (e.g., a battery, a voltage/power source) and/or may be coupled to a power supply. Other components such as a number of surface mount technology (SMT) devices 314 and an antenna switch module (ASM) 312 can also be mounted on the packaging substrate 302. Although all of the various components are depicted as being laid out on the packaging substrate 302, it will be understood that some component(s) may be implemented over other component(s). In some embodiments, the components of the RF module 300 and one or more serial buses/interfaces (e.g., a RFFE bus/interface) used by the components of the RF module 300 may implement and/or perform one or more features as described herein.

In some implementations, a device and/or a circuit having one or more features described herein may be included in a device such as a wireless device. Such a device and/or a circuit may be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 5:
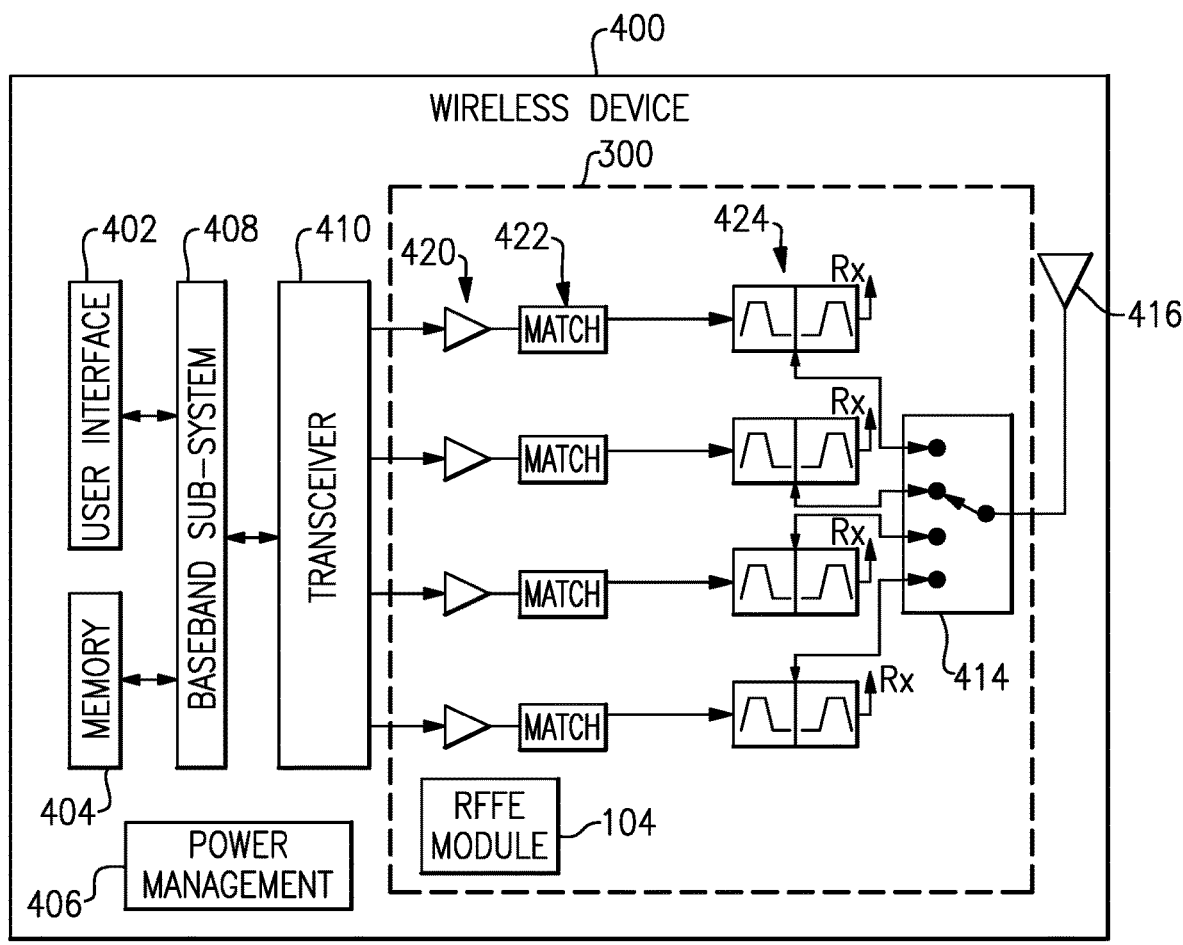
FIG. 5 is a diagram illustrating an example wireless device, according to some embodiments of the present disclosure.

FIG. 5 depicts an example wireless device 400 having one or more advantageous features described herein. In the context of a module having one or more features as described herein, such a module can be generally depicted by a dashed box 300, and can be implemented as, for example, a front-end module (FEM). Such a module can include an RFFE module 104 having one or more features as described herein. For example, the RFFE module 104 may include bus monitoring logic/functions that may be included in a device/component (e.g., included in a PA 420).

Referring to FIG. 5, power amplifiers (PAs) 420 can receive their respective RF signals from a transceiver 410 that can be configured and operated in known manners to generate RF signals to be amplified and transmitted, and to process received signals. The transceiver 410 is shown to interact with a baseband sub-system 408 that is configured to provide conversion between data and/or voice signals suitable for a user and RF signals suitable for the transceiver 410. The transceiver 410 can also be in communication with a power management component 406 that is configured to manage power for the operation of the wireless device 400. Such power management can also control operations of the baseband sub-system 408 and the module 300.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example wireless device 400, outputs of the PAs 420 are shown to be matched (via respective match circuits 422) and routed to their respective duplexers 424. Such amplified and filtered signals can be routed to an antenna 416 through an antenna switch 414 for transmission. In some embodiments, the duplexers 424 can allow transmit and receive operations to be performed simultaneously using a common antenna (e.g., 416). In FIG. 5, received signals are shown to be routed to "Rx" paths (not shown) that can include, for example, a low-noise amplifier (LNA). In some embodiments, the various components, devices, modules, and/or circuits of the wireless device 400 may be coupled to a serial bus (e.g., an RFFE bus) and may include a monitor, as discussed above.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Figure 6:
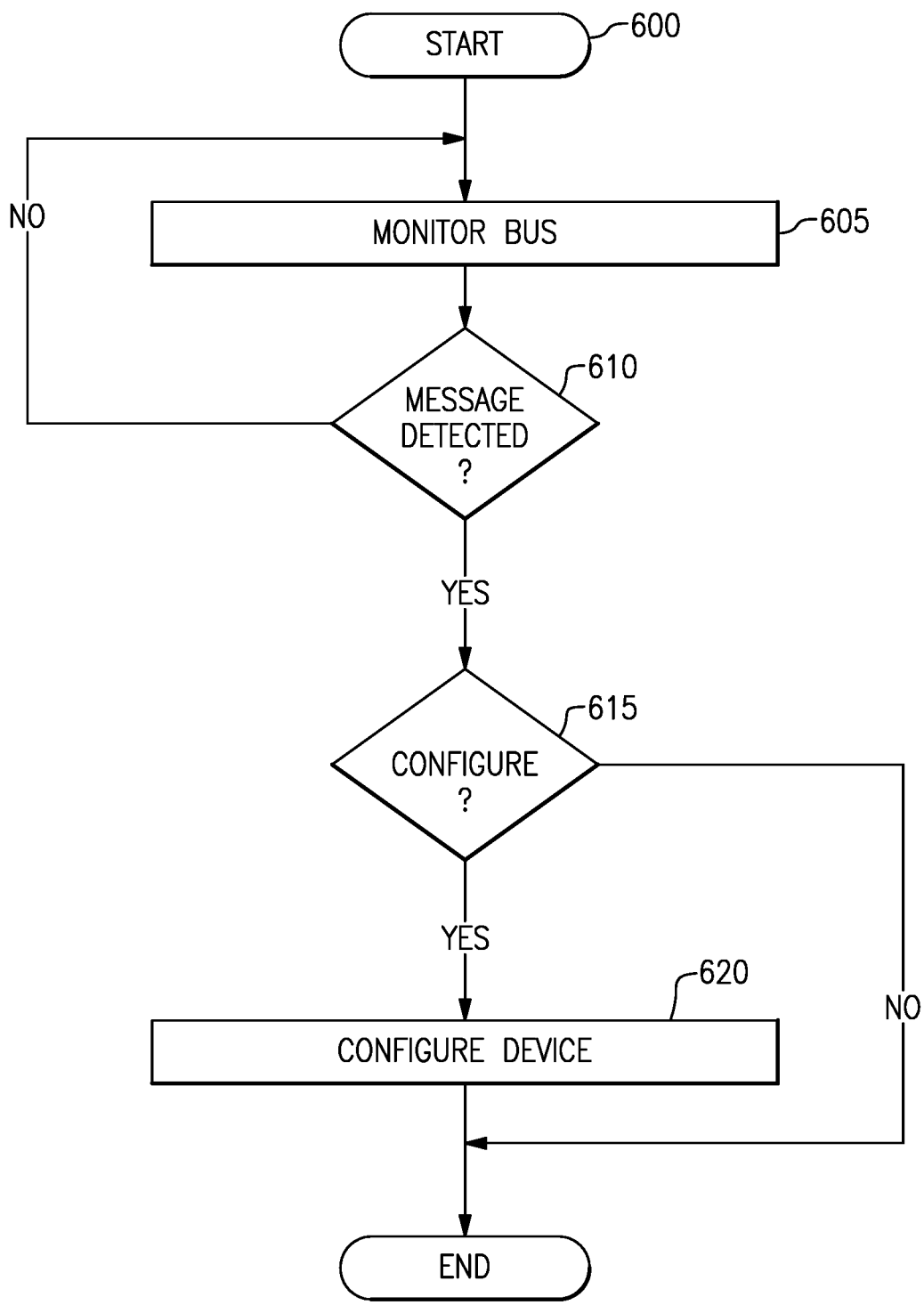
FIG. 6 is a flow diagram illustrating a process for operating a RF device, according to some embodiments of the present disclosure.

FIG. 6 is a flow diagram illustrating a process 600 for operating a RF device, according to some embodiments of the present disclosure. The process 600 may be performed by processing logic that comprises hardware (e.g., circuitry, dedicated logic, programmable logic, microcode, etc.), firmware, software (e.g., instructions run on a processor to perform hardware simulation), or a combination thereof. In one embodiment, process 600 may be performed by a monitor, an RF module, and/or a RF device. For example, the process 600 may be performed by the slave device 110 and/or the monitor 111 illustrated in FIG. 3. In addition, the process 600 could alternatively be represented as a series of interrelated states via a state diagram or events.

The process 600 begins at block 605 where the process 600 monitors a serial bus for data and/or messages. At block 610, the process determines whether any messages were detected on the serial bus. If no messages were detected, the process proceeds to block 605. If a message was detected, the process proceeds to block 615 where the process 600 determines whether a device (e.g., an RF device, a RF component, a RF module, a RF circuit, etc.) should be configured. For example, the process 600 may analyze and/or process the message (e.g., data) to determine whether a device can be configured based on the data. If the process 600 determines that the device should be not be configured, the process 600 ends. For example, the process 600 may determine that a device does not need to be configured or cannot be configured based on the message. If the process 600 determines that the device should be configured, the process 600 proceeds to block 620 where the process 600 configures the device. For example, the process 600 may adjust a configuration of a device, change a mode of a device, and/or perform an operation, as discussed above. After block 620, the process 600 ends.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts may be performed as a single step and/or phase. Also, certain steps and/or phases may be broken into additional sub-components to be performed separately. In some instances, the order of the steps and/or phases may be rearranged and certain steps and/or phases may be omitted entirely. Also, the methods described herein are to be understood to be open-ended, such that additional steps and/or phases to those shown and described herein may also be performed.

Although various embodiments and examples are disclosed above, inventive subject matter extends beyond the specifically disclosed embodiments to other alternative embodiments and/or uses and to modifications and equivalents thereof. Thus, the scope of the claims that may arise from this disclosure is not limited by any of the particular embodiments described above. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Some aspects of the systems and methods described herein may advantageously be implemented using, for example, computer software, hardware, firmware, or any combination of computer software, hardware, and firmware. Computer software may comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that may be implemented using software to be executed on a general purpose computer may also be implemented using a different combination of hardware, software, or firmware. For example, such a module may be implemented completely in hardware using a combination of integrated circuits. Alternatively or additionally, such a feature or function may be implemented completely or partially using specialized computers designed to perform the particular functions described herein rather than by general purpose computers.

Multiple distributed computing devices may be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that may direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations. Furthermore, the terms "first," "second," "third," "fourth," etc., as used herein are meant as labels to distinguish among different elements and may not necessarily have an ordinal meaning according to their numerical designation.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein may be applied to other methods and systems, and are not limited to the methods and systems described above, and elements and acts of the various embodiments described above may be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless device comprising:
a transceiver configured to process signals;
a radio-frequency module in communication with the transceiver, the radio-frequency module including a serial bus and a first radio-frequency amplifier, the first radio-frequency amplifier coupled to the serial bus and including a monitoring component configured to monitor the serial bus for first data addressed to and transmitted to a second radio-frequency amplifier coupled to the serial bus, the first data directed to the second radio-frequency amplifier and including an identifier of the second radio-frequency amplifier, the first data including configuration information relating to the second radio-frequency amplifier, the monitoring component further configured to detect the first data transmitted to the second radio-frequency amplifier and to set or modify a configuration of the first radio-frequency amplifier based on the configuration information relating to the second radio-frequency amplifier in the detected first data transmitted to the second radio-frequency amplifier, operation of the first radio-frequency amplifier dependent on the second radio-frequency amplifier; and
an antenna in communication with the radio-frequency module, the antenna configured to transmit or receive signals.

2. The wireless device of claim 1 wherein the first data indicates a configuration state of the second radio-frequency amplifier.

3. The wireless device of claim 1 wherein the first data indicates an operation of the second radio-frequency amplifier.

4. The wireless device of claim 1 wherein the first data indicates a mode of the second radio-frequency amplifier.

5. The wireless device of claim 1 wherein the monitoring component is further configured to monitor the serial bus for second data of a third device coupled to the serial bus and to set or modify the configuration of the first radio-frequency amplifier based on the second data.

6. The wireless device of claim 1 wherein the first radio-frequency amplifier further includes a second monitoring component configured to monitor the serial bus for second data of a third device coupled to the serial bus and to set or modify the configuration of the first radio-frequency amplifier based on the second data.

7. The wireless device of claim 1 wherein the first radio-frequency amplifier and the second radio-frequency amplifier are located in a same radio-frequency module.

8. The wireless device of claim 1 wherein the first radio-frequency amplifier and the second radio-frequency amplifier are located in separate radio-frequency modules.

9. The wireless device of claim 1 wherein the monitoring component is configured to set or modify one or more of an operation of the first radio-frequency amplifier or a mode of the first radio-frequency amplifier based on the first data.

* * * * *